United States Patent [19]

Larsen

[11] Patent Number: 5,551,747
[45] Date of Patent: Sep. 3, 1996

[54] TRUCK BED AIR DEFLECTOR

[76] Inventor: Charles E. Larsen, 3610 Emerson Dr., Carson City, Nev. 89706

[21] Appl. No.: 385,593

[22] Filed: Feb. 8, 1995

[51] Int. Cl.[6] .................................................. B62D 35/00
[52] U.S. Cl. ...................................................... 296/180.1
[58] Field of Search .............................. 296/180.1, 37.6, 296/50, 57.1

[56]  References Cited

U.S. PATENT DOCUMENTS

| 4,451,075 | 5/1984 | Canfield | 296/180.1 X |
| 4,506,870 | 3/1985 | Penn | 296/180.1 |
| 5,234,249 | 8/1993 | Dorrell | 296/180.1 |

*Primary Examiner*—Andrew C. Pike

[57] ABSTRACT

A truck bed air deflector comprises of an air deflector shield having a generally rectangular configuration. The air deflector shield is dimensioned to be received within a truck bed. A pair of spring-loaded hinges is secured to opposing end portions of a first end of the air deflector shield. The spring-loaded hinges have mounting brackets theresecured. The mounting brackets are adapted to be secured to the truck bed thereby securing the air deflector shield to the truck bed. The spring-loaded hinges bias the air deflector shield to a raised position parallel with a tailgate of the truck bed. A pair of L-shaped locking latches are pivotally secured to a mounting bracket. Each mounting bracket is secured to the truck bed adjacent to a second end of the air deflector shield. The locking latches are adapted to secure the second end of the air deflector shield in a stowed position.

4 Claims, 4 Drawing Sheets

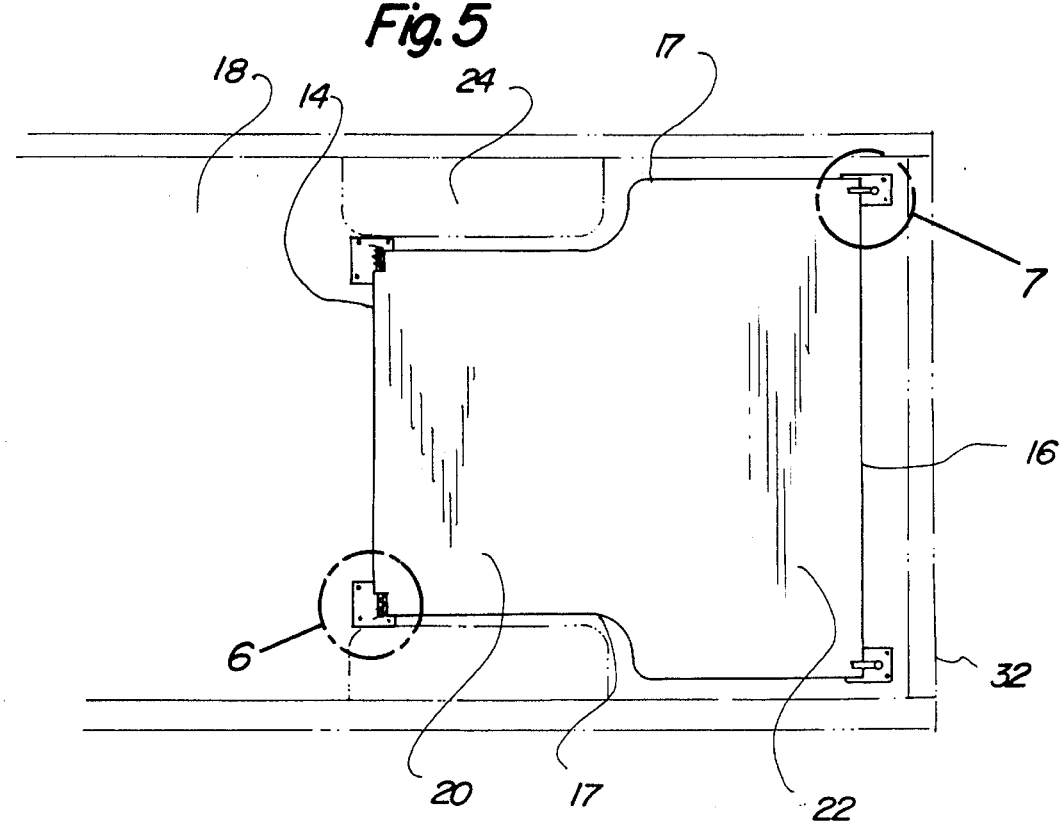
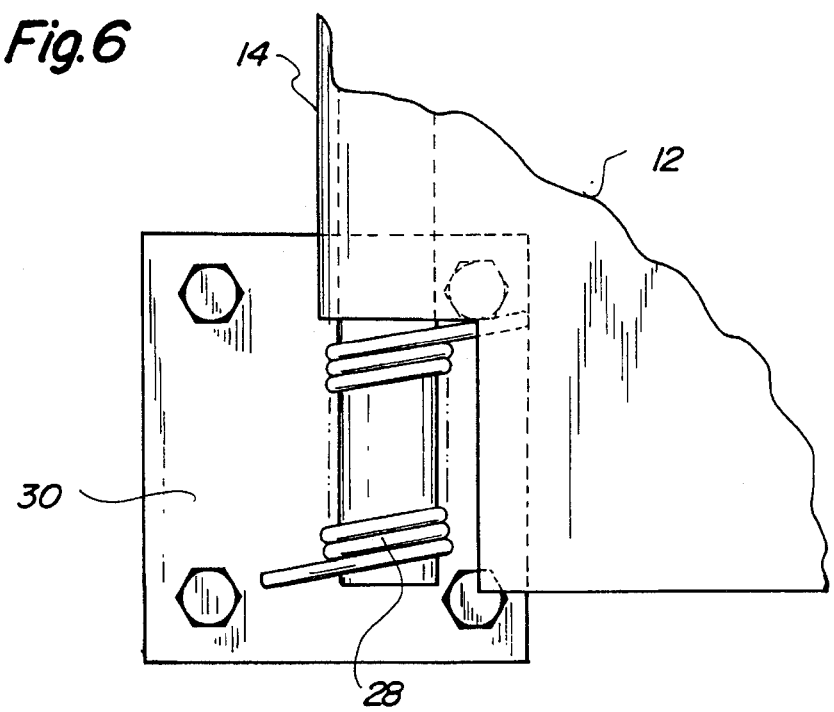

TRUCK BED AIR DEFLECTOR

BACKGROUND OF THE INVENTION

1. Field of the Invention

The present invention relates to a truck bed air deflector and more particularly pertains to managing the airflow through a truck bed to minimize drag and increase fuel efficiency with a truck bed air deflector.

2. Description of the Prior Art

The use of drag reducers is known in the prior art. More specifically, drag reducers heretofore devised and utilized for the purpose of displacing airflow are known.

By way of example, U.S. Pat. No. 5,273,339 to Flynn discloses a tailgate enclosure device having reduced drag.

U.S. Pat. No. 5,236,347 to Andrus discloses a drag reducer for the rear end of a vehicle.

U.S. Pat. No. 5,083,829 to Fonseca discloses a pickup truck storage trunk and air foil.

U.S. Pat. No. 4,573,730 to Gondert et al. discloses a drag reducing partial tonneau for pickup truck.

U.S. Pat. No. 4,357,045 to Kinford, Jr. discloses a method and apparatus for reducing air drag on truck type wheeled vehicles.

While these devices fulfill their respective, particular objective and requirements, the aforementioned patents do not describe a truck bed air deflector with spring loaded hinges for managing the airflow through a truck bed to minimize drag and increase fuel efficiency.

In this respect, the truck bed air deflector according to the present invention substantially departs from the conventional concepts and designs of the prior art, and in doing so provides an apparatus primarily developed for the purpose of managing the airflow through a truck bed to minimize drag and increase fuel efficiency.

SUMMARY OF THE INVENTION

In the view of the known types of drag reducers now present in the prior art, the present invention provides an improved truck bed air deflector. As such, the general purpose of the present invention, which will be described subsequently in greater detail, is to provide a new and improved truck bed air deflector and method.

To attain this, the present invention essentially comprises an air deflector shield having a generally rectangular configuration. The air deflector shield has a first end, a second end, and two side portions. The air deflector shield is dimensioned to be received within a truck bed. The air deflector shield has a first width and a second width. The first width corresponds to wheel wells of the truck bed. The second width corresponds to the truck bed. A pair of spring-loaded hinges are secured to opposing end portions of the first end of the air deflector shield. The spring-loaded hinges have mounting brackets theresecured. The mounting brackets are adapted to be secured to the truck bed thereby securing the air deflector shield to the truck bed. The spring-loaded hinges bias the air deflector shield to a raised position parallel with a tailgate of the truck bed. The device contains a pair of L-shaped locking latches. Each of the locking latches has an upper end and a lower end. Each lower end has a rivet secured therethrough. Each rivet is pivotally secured to a mounting bracket. Each mounting bracket is secured to the truck bed adjacent to the second end of the air deflector shield. Each upper end of the locking latches is adapted to secure to the second end of the air deflector shield in a stowed position.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Even still another object of the present invention is to provide a new and improved truck bed air deflector for managing the airflow through a truck bed to minimize drag and increase fuel efficiency.

Lastly, it is an object of the present invention to provide a new and improved truck bed air deflector comprised of an air deflector shield having a generally rectangular configuration. The air deflector shield is dimensioned to be received within a truck bed. A pair of spring-loaded hinges is secured to opposing end portions of a first end of the air deflector shield. The spring-loaded hinges have mounting brackets theresecured. The mounting brackets are adapted to be secured to the truck bed thereby securing the air deflector shield to the truck bed. The spring-loaded hinges bias the air deflector shield to a raised position parallel with a tailgate of the truck bed. A pair of L-shaped locking latches are pivotally secured to a mounting bracket. Each mounting bracket is secured to the truck bed adjacent to a second end of the air deflector shield. The locking latches are adapted to secure to the second end of the air deflector shield in a stowed position.

These together with other objects of the invention, along with the various features of novelty which characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a plan view of the present invention in the stowed position.

FIG. 6 is a detailed view taken at circle 6 of FIG. 5.

The same reference numerals refer to the same parts through the various figures.

DESCRIPTION OF THE PREFERRED EMBODIMENT

Figure 1:
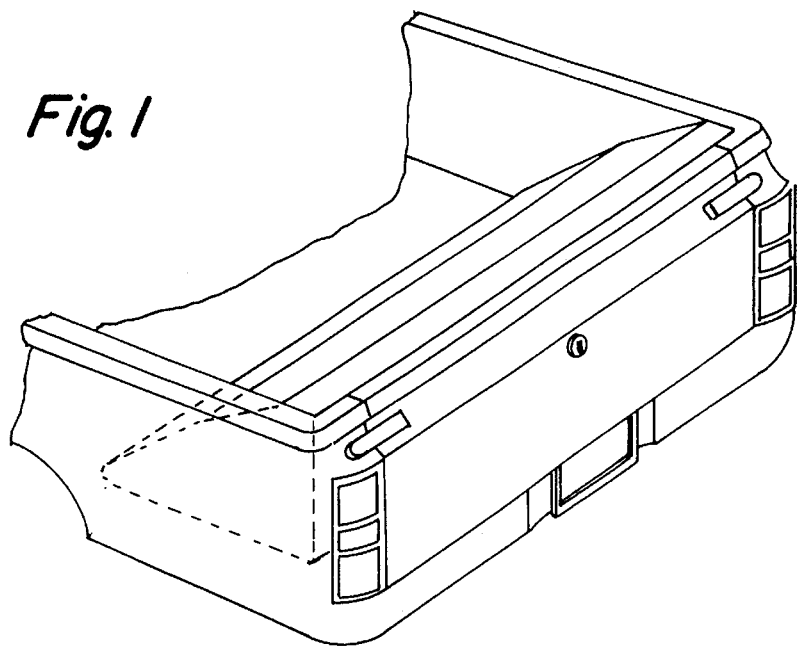
FIG. 1 is a perspective view of the prior art pickup truck storage trunk and air foil.
Figure 2:
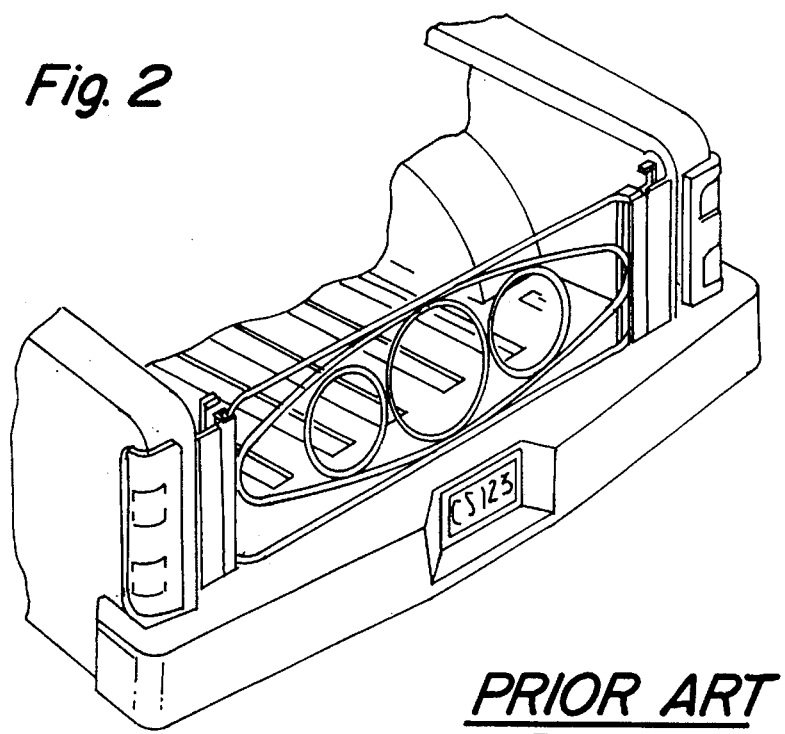
FIG. 2 is a perspective view of the prior art tailgate enclosure device having reduced drag.
Figure 3:
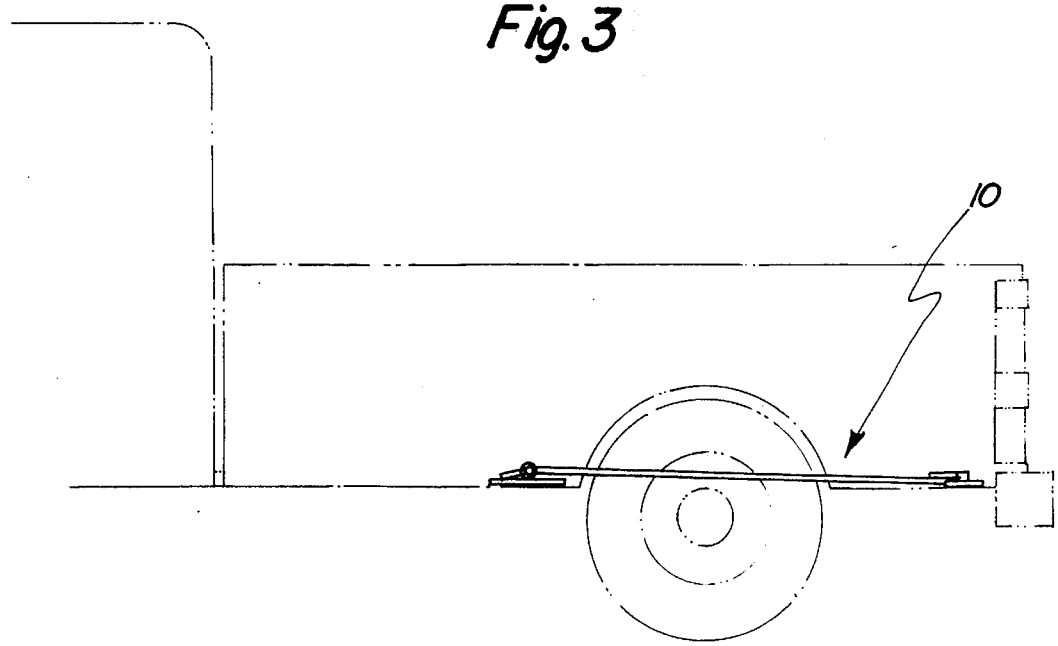
FIG. 3 is a side elevation view of the present invention in a stowed position.
Figure 4:
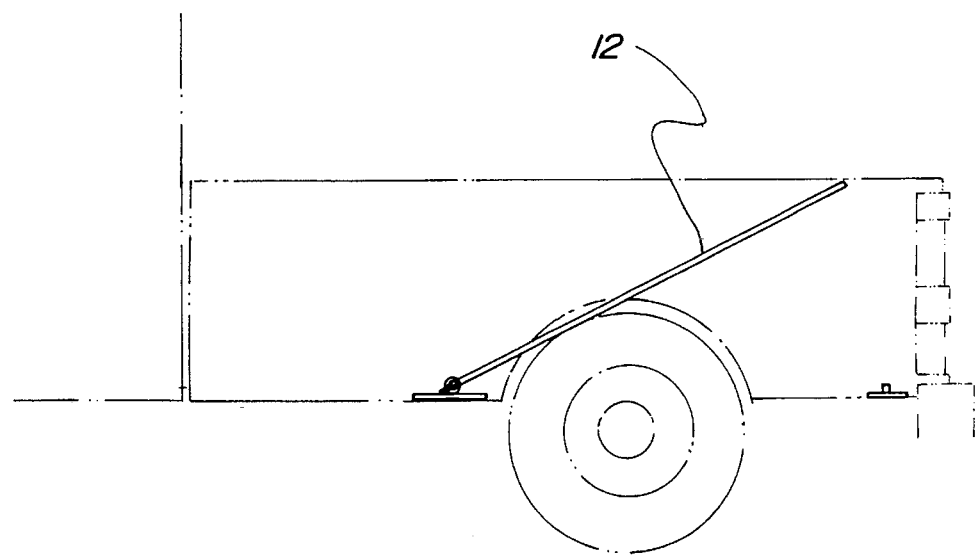
FIG. 4 is a side elevation view of the present invention in a raised position.
Figure 7:
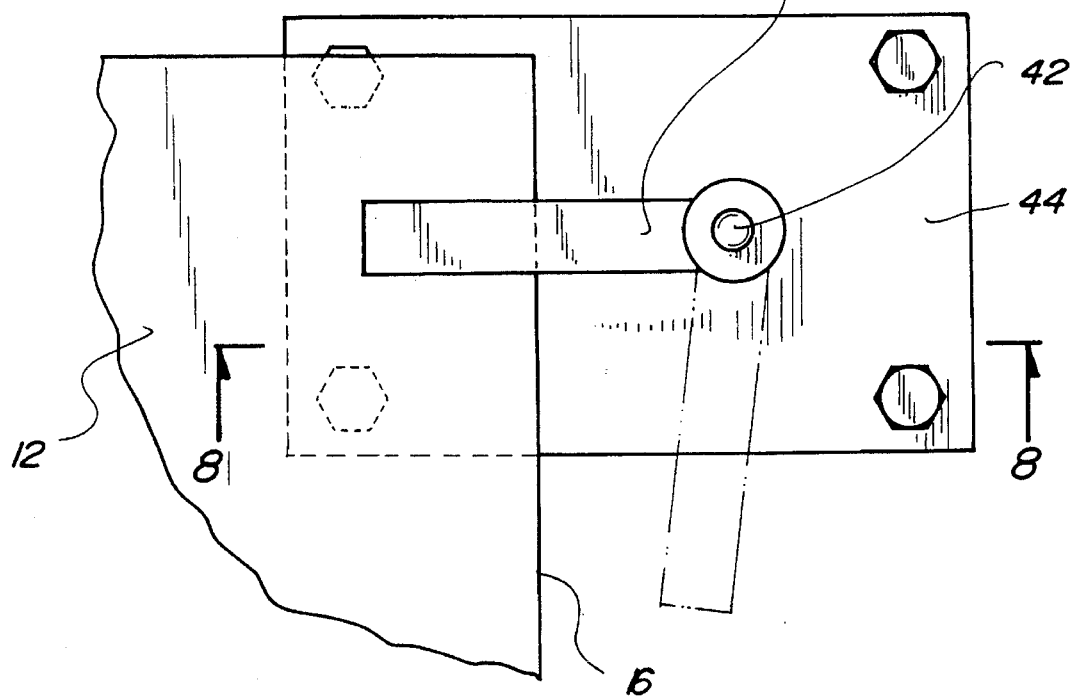
FIG. 7 is a detailed view taken at circle 7 of FIG. 5.
Figure 8:
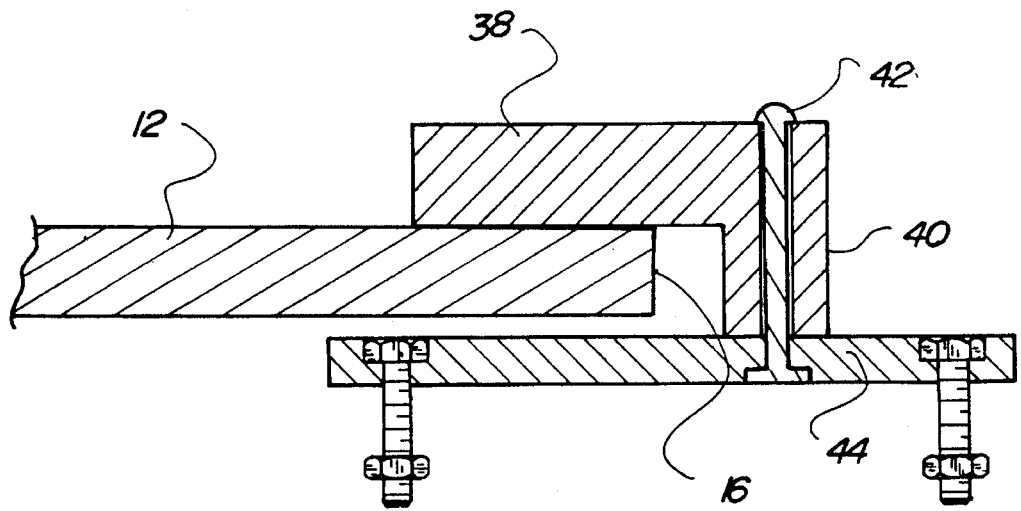
FIG. 8 is a cross-sectional view as taken along line 8—8 of FIG. 7.

With reference now to the drawings, and in particular, to FIG. 5 thereof, the preferred embodiment of the new and improved truck bed air deflector embodying the principles and concepts of the present invention and generally designated by the reference number 10 will be described.

Specifically, it will be noted in the various figures that the device relates to a new and improved truck bed air deflector for managing the airflow through a truck bed to minimize drag and increase fuel efficiency. In its broadest context, the device consists of an air deflector shield, a pair of spring-loaded hinges, and a pair of L-shaped locking latches.

The device 10 contains an air deflector shield 12 having a generally rectangular configuration. The air deflector shield 12 has a first end 14, a second end 16, and two side portions 17. The air deflector shield 12 is dimensioned to be received within a truck bed 18. The air deflector shield 12 has a first width 20 and a second width 22. The first width 20 corresponds to wheel wells 24 of the truck bed 18. The second width 22 corresponds to the truck bed 18.

A pair of spring-loaded hinges 28 are secured to opposing end portions of the first end 14 of the air deflector shield 12. The spring-loaded hinges 28 have mounting brackets 30 theresecured. The mounting brackets 30 are adapted to be secured to the truck bed 18 thereby securing the air deflector shield 12 to the truck bed 18. The spring-loaded hinges 28 bias the air deflector shield 12 to a raised position parallel with a tailgate 32 of the truck bed 18.

The device 10 contains a pair of L-shaped locking latches 36. Each of the locking latches 36 has an upper end 38 and a lower end 40. Each lower end 40 has a rivet 42 secured therethrough. Each rivet 42 is pivotally secured to a mounting bracket 44. Each mounting bracket 44 is secured to the truck bed 18 adjacent to the second end 16 of the air deflector shield 12. Each upper end 38 of the locking latches 34 is adapted to secure to the second end 16 of the air deflector shield 12 in a stowed position.

The present invention is a wind deflector for pickup trucks that is designed to manage the airflow through the bed 18 to minimize drag and increase fuel efficiency.

It is fabricated from durable plastic or metal in a rectangular shape with two spring-loaded hinges 28 on one side, and two locking latches 36 on the other. It is sized to fit into the rear of a truck bed 18, behind the wheel wells 24. In its operational state, the leading edge is located on the bottom of the bed 18, while the trailing edge is raised to meet the tailgate 32. The inclined angle helps to route the airflow through the bed 18 more efficiently than vehicles where the air meets a vertically oriented tailgate.

To install and use it, the hinges 28 are mounted to the truck bed 18 with conventional hardware. The deflector 12 is then attached directly to the hinges 28. The spring-loaded feature of the hinges 28 helps the owner to raise the deflector 12 with relative ease. When the full length of the bed 18 is to be utilized, the trailing edge is lowered to the bed 18 surface where its latches 36 will hold it in place. Even without lowering it, over half the bed 18 can still be utilized for carrying cargo. Additionally, the space under the deflector 12 can also be used as a hidden storage area.

It helps owners of pickup trucks to improve the fuel efficiency of their vehicles without having to remove the tailgate or replace it with a net. Anyone who owns a pickup truck should appreciate the clever advantages of this invention.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function, and the manner of operation, assembly, and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes thereto will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

I claim:

1. A truck bed air deflector for managing airflow through a truck bed to minimize drag and increase fuel efficiency comprising, in combination: an air deflector shield having a generally rectangular configuration, the air deflector shield having a first end, a second end, and two side portions, the air deflector shield being dimensioned to be received within the truck bed, the air deflector shield having a first width and a second width, the first width corresponding to wheel wells of the truck bed, the second width corresponding to the truck bed;

a pair of spring-loaded hinges secured to opposite end portions of the first end of the air deflector shield, the spring-loaded hinges having mounting brackets theresecured, the mounting brackets being adapted to be secured to the truck bed thereby securing the air deflector shield to the truck bed, the spring-loaded hinges biasing the air deflector shield to a raised position parallel with a tailgate of the truck bed; and a pair of L-shaped locking latches, each of the locking latches having an upper end and a lower end, each lower end having a rivet secured therethrough, each rivet being pivotally secured to a mounting bracket, each mounting bracket being secured to the truck bed adjacent to the second end of the air deflector shield, each upper end of the locking latches being adapted to secure the second end of the air deflector shield in a stowed position.

2. The air deflector shield as described in claim 1 wherein the air deflector shield is fabricated of metal.

3. A truck bed air deflector for managing airflow through a truck bed to minimize drag and increase fuel efficiency comprising, in combination:

an air deflector shield having a generally rectangular configuration, the air deflector shield being dimensioned to be received within the truck bed;

a pair of spring-loaded hinges secured to opposite end portions of a first end of the air deflector shield, the spring-loaded hinges having mounting brackets theresecured, the mounting brackets being adapted to be secured to the truck bed thereby securing the air deflector shield to the truck bed, the spring-loaded hinges biasing the air deflector shield to a raised position parallel with a tailgate of the truck bed; and a pair of L-shaped locking latches each pivotally secured to a mounting bracket, each mounting bracket being secured to the truck bed adjacent to a second end of the air deflector shield, the locking latches being adapted to secure the second end of the air deflector shield in a stowed position.

4. The air defector as described in claim 3 wherein the air deflector shield has a first width and a second width, the first width corresponding to wheel wells of the truck bed, the second width corresponding to the truck bed.

* * * * *